United States Patent
Zhao et al.

(10) Patent No.: US 9,866,150 B2
(45) Date of Patent: Jan. 9, 2018

(54) MAGNETO-CALORIC POWER GENERATION EQUIPMENT

(71) Applicant: Guangdong Magnetic Electronic Co., Ltd., Foshan, Guangdong (CN)

(72) Inventors: Tian an Zhao, Foshan (CN); Kewen Long, Foshan (CN); Tianbao Yan, Foshan (CN)

(73) Assignee: Guangdong Magnetic Electronic Co., Ltd. (CN)

( * ) Notice: Subject to any disclaimer, the term of this patent is extended or adjusted under 35 U.S.C. 154(b) by 0 days.

(21) Appl. No.: 15/325,405

(22) PCT Filed: May 27, 2015

(86) PCT No.: PCT/CN2015/079869
§ 371 (c)(1),
(2) Date: Jan. 10, 2017

(87) PCT Pub. No.: WO2016/050090
PCT Pub. Date: Apr. 7, 2016

(65) Prior Publication Data
US 2017/0201193 A1    Jul. 13, 2017

(30) Foreign Application Priority Data
Sep. 30, 2014  (CN) .......... 2014 1 05198945

(51) Int. Cl.
*H02K 5/20*     (2006.01)
*H02N 11/00*    (2006.01)
*H02K 7/18*     (2006.01)

(52) U.S. Cl.
CPC ......... *H02N 11/006* (2013.01); *H02K 7/1807* (2013.01)

(58) Field of Classification Search
CPC .................. H02K 5/20; H02K 9/19
(Continued)

(56) References Cited

U.S. PATENT DOCUMENTS 5,334,899 A * 8/1994 Skybyk ............... H02K 1/2793
                                                   310/114
6,072,253 A * 6/2000 Harpenau ............. H02K 5/20
                                                   310/54

(Continued)

FOREIGN PATENT DOCUMENTS

| CN | 103401474 U | 11/2013 |
|---|---|---|
| CN | 104320019 A | 1/2015 |
| WO | WO 9415393 A1 | 7/1994 |

*Primary Examiner* — Alexander Talpalatski

(57) ABSTRACT

A magneto-caloric power generation equipment comprising at least one magneto-caloric power generation unit; the magneto-caloric power generation unit comprises two supports provided in a correspondingly connected manner; a rotor, a stator and a heating and cooling device; the supports are provided with an axle seat A, the rotor is provided with an axle seat B, an accommodating space is provided between the two supports, and the rotor is provided in the accommodating space; the rotor comprises an annular support, wherein both sides of the annular support are provided with an even number groups of hard magnet fixing grooves; the hard magnet fixing grooves of two sides of the annular support are provided in a staggered manner, and an annular accommodating groove is formed in the even groups of hard magnet fixing grooves on the same side of the annular support.

22 Claims, 15 Drawing Sheets

(58) Field of Classification Search
USPC .......................................................... 335/229
See application file for complete search history.

(56) References Cited

U.S. PATENT DOCUMENTS

| | | | |
|---|---|---|---|
| 2010/0158714 A1* | 6/2010 | Werson | F04D 13/0666 417/366 |
| 2013/0015735 A1* | 1/2013 | Lepres | H02K 5/20 310/64 |
| 2013/0076171 A1* | 3/2013 | Lepres | H02K 1/20 310/59 |
| 2013/0293041 A1* | 11/2013 | Steinbauer | H02K 5/20 310/52 |
| 2014/0125162 A1* | 5/2014 | Tsuchie | H02K 9/19 310/54 |

* cited by examiner

MAGNETO-CALORIC POWER GENERATION EQUIPMENT

TECHNICAL FIELD OF THE INVENTION

The present invention relates to the technical field of magneto-caloric machines, and more particularly, to a magneto-caloric power generation equipment.

BACKGROUND OF THE INVENTION

The magneto-caloric power generation equipment is a device capable of turning thermal energy into magnetic energy, which can be further converted into mechanical energy to do work so as to generate the electricity. The traditional magneto-caloric power generation equipment usually comprises a stator which is provided with the soft magnets, two rotors which are provided with the hard magnets, and a heating and cooling system, which can heat and cool the soft magnets in the stator.

In the prior art, the conversion efficiency between the thermal energy and the mechanical energy is severely affected by the unreasonable structure of the traditional magneto-caloric power generation equipment (referring to the specification of the Chinese patent 201310321824.4). The shortcomings are the following:

First, the arrangement of the stator and the rotors is unreasonable because the two rotors are respectively disposed in parallel on the two sides of the stator, the soft magnets are disposed on the two sides of the stator, and the hard magnets are correspondingly disposed on the inner sides of the two rotors. Consequently, the soft magnets in the stator and the hard magnets in the rotors are arranged in parallel in a vertical direction, resulting in a large and unstable distance between the hard magnets and the soft magnets;

Second, the stator is round-shaped and plate-like. Accordingly, the two sides are provided with soft magnets in a staggered manner; the soft magnets on the same side are equally distributed, and a heating pipe or a cooling pipe is disposed between the two adjacent soft magnets on the same side; in such a structure, heating fluid in the heating pipe and the cooling fluid in the cooling pipe are not in direct contact with the soft magnets resulting in a very limited heating and cooling effect; furthermore, the heat transmission can be severely affected by this structure, leading to a very low conversion efficiency of the thermal energy; Third, due to the unreasonable arrangement of the components, the traditional magneto-caloric power generation equipment has a cumbersome structure and a low integration level, resulting in a difficult and low-efficient assembling process.

In conclusion, the shortcomings of traditional magneto-caloric power generation equipment are urgent problems that need to be solved for those skilled in this field.

SUMMARY OF THE INVENTION

The purpose of the present invention is to provide a magneto-caloric power generation equipment, aiming to solve the technical problems (the distance between the hard magnets and the soft magnets is large and unstable, and the soft magnets cannot be directly contacted by the heat-conducting fluid in the heat-conducting pipe and the cooling fluid in the cooling pipe) in the prior art.

To achieve the above purpose, the present invention adopts the following technical solution:

A magneto-caloric power generation equipment comprising at least one magneto-caloric power generation unit. The magneto-caloric power generation unit comprises two supports which are correspondingly connected, a rotor, two stators and a heating and cooling device. The supports are provided with an axle seat A, and the rotor is provided with an axle seat B. An accommodating space is formed between the two supports, and the rotor is disposed in the accommodating space. A dynamic rotation axle is inserted into the axle seat A and the axle seat B, enabling the rotor to rotate in the accommodating space. One end of the dynamic rotation axle is connected to the power generation equipment. The heating and cooling device is fixed on the supports. The rotor comprises an annular support, which is concentric with the axle seat B. The axle seat B is disposed in the annular support, and a plurality of supporting pieces is disposed between the outer wall of the axle seat B and the inner wall of the annular support. The two sides of the annular support are provided with even number groups of hard magnet fixing grooves. The hard magnet fixing grooves of the two sides of the annular support are configured in a staggered manner. Each group of hard magnet fixing grooves is uniformly distributed on the annular support. The even groups of hard magnet fixing grooves on the same side of the annular support are provided with annular accommodating grooves. The hard magnet fixing grooves are provided with the hard magnets. The two stators, which can move towards each other, are disposed in the accommodating grooves of the two sides of the annular support. The two stators are respectively fixed on the corresponding support. The stator comprises an annular cavity which has an opening on one side, and a cover plate corresponding to the opening of the annular cavity. An even number of soft magnet cavities are uniformly distributed in the annular cavity. The number of soft magnet cavities is same as that of the hard magnet fixing grooves on one side of the annular support. The soft magnet cavities are provided with soft magnets. The accommodating cavity cover plate is provided with a fluid inlet pipe and a fluid outlet pipe, which are interconnected to the annular cavity. The fluid inlet pipe is connected to the corresponding fluid outlet of the heating and cooling device. The fluid outlet pipes of the two stators are connected to the fluid discharging system.

In another aspect of the present invention, each group of the hard magnet fixing grooves of the rotor comprises an outer fixing groove and an inner fixing groove, which are arc-shaped or tile-like. The outer fixing groove and the inner fixing groove are correspondingly provided with the hard magnets. An outer connecting bar is disposed between any two adjacent outer fixing grooves, and an inner connecting bar is disposed between any two adjacent inner fixing grooves. An accommodating space is formed between the outer fixing groove and the inner fixing groove. The annular accommodating groove is formed by the accommodating space between the outer fixing grooves and the inner fixing groove on the same side of the annular support.

In another aspect of the present invention, each outer connecting bar is provided with a fixing hole A. All of the fixing holes A are disposed on the same circumference. The outer end of the supporting piece is fixed on the inner connecting bar. A resident dynamic magnet is provided in the fixing hole A. A mounting plate is disposed on the support, and a mounting hole is provided on the mounting plate. A resident static magnet is disposed in the mounting hole, and the resident dynamic magnet is disposed to correspond to the resident static magnet.

In another aspect of the present invention, the two sides of the upper part of the support piece are provided with two fixing holes B, which are symmetrically provided. The fixing holes B, which are provided on the plurality of supporting pieces, are on the same circumference. An external magnet is disposed on the fixing hole B. The heating and cooling device comprises a support body. A valve cover is correspondingly disposed on at least one side of the support body. The support body is provided with a hot fluid pipe and a cold fluid pipe. A hot fluid inlet, a cold fluid inlet, a hot fluid valve port, a cold fluid valve port and a fluid outlet groove are formed on the support body. The hot fluid pipe is interconnected to the hot fluid inlet, and the hot fluid inlet is interconnected to the hot fluid valve port. The cold fluid pipe is interconnected to the cold fluid inlet, and the cold fluid inlet is interconnected to the cold fluid valve port. A valve chamber A, a valve chamber B, an interconnecting groove A, an interconnecting groove B and a fluid outlet are formed on the valve cover. The fluid outlet is interconnected to the fluid outlet groove. The fluid outlet groove is interconnected to the valve chamber A through the interconnecting groove A, and the fluid outlet groove is interconnected to the valve chamber B through the interconnecting groove B. The valve chamber A and the valve chamber B are provided with magnetic drive valves. The inlets of the two magnetic drive valves are respectively connected to the hot fluid valve port and the cold fluid valve port. The plurality of external magnets is disposed to correspond to the two magnetic drive valves.

In another aspect of the present invention, the support comprises two supporting side plates and the axle seat A. The two side plates are vertically disposed to correspond to each other. The bottoms of the two supporting side plates are firmly connected through a connecting plate. The axle seat A is disposed in the middle of the frame formed by the two supporting side plates and the connecting plate. The axle seat A is firmly connected to the supporting side plates or the connecting plate through a plurality of supporting beams. The upper part and the lower part of the inner side of the supporting side plates are provided with connecting bridge plates in horizontal direction. An correcting mechanism B is disposed on the connecting bridge plate. The correcting mechanism B comprises an alignment fixing hole and an alignment fixing convex, which are respectively disposed at the two ends of the connecting bridge plate. The two supports are connected through the connection between the alignment fixing hole and the alignment fixing convex. A fixing groove is provided on the support, and the heating and cooling device is firmly disposed in the fixing groove.

In another aspect of the present invention, the outer end parts of the plurality of supporting beams are provided with fixing connection holes. The outer side of the accommodating cavity cover plate is provided with a plurality of fixing columns. The stator is fixed on the support through the connection between the fixing columns and the fixing connection holes.

In another aspect of the present invention, a connecting base is disposed on the connecting plate. The support body is provided with a fluid return pipe. The fluid discharging system is formed by the connecting base and the fluid return pipe. The upper part of the connecting base is provided with a fluid inlet, and the lower part of the connecting base is provided with a fluid outlet. The fluid outlet pipe is connected to the fluid inlet. The fluid return pipe is provided with a return fluid inlet. A high temperature fluid return pipe and a low temperature fluid return pipe are disposed in the fluid return pipe in parallel. The return fluid inlet is respectively interconnected to the high temperature fluid return pipe and the low temperature fluid return pipe. A temperature control valve is disposed in the return fluid inlet, and the temperature control valve is provided with an inlet, an outlet A and an outlet B. The outlet A and the outlet B are respectively interconnected to the high temperature fluid return pipe and the low temperature fluid return pipe.

In another aspect of the present invention, the outer side wall of the outer fixing groove and the inner side wall of the inner fixing groove are provided with locking elastic pieces. The inner side of the upper end part of the locking elastic piece is provided with a locking hook. A magnet cover is applied on the exterior of the hard magnet. The outer edge of the magnetic cover is engaged with the locking hook.

In another aspect of the present invention, a fluid inlet hole is provided between the two soft magnet cavities at the upper part of the annular cavity, and a fluid outlet hole is provided between the two soft magnet cavities at the lower part of the annular cavity. The fluid inlet hole and the fluid outlet hole are interconnected to the soft magnet cavities on the two sides. The two adjacent magnetic cavities having no fluid inlet hole or fluid outlet hole between each other are interconnected. The accommodating cavity cover plate is annular-shaped. The fluid inlet pipe and the fluid outlet pipe are inserted into the accommodating cavity cover plate. The fluid inlet pipe and the fluid outlet pipe are respectively disposed to correspond to the fluid inlet hole and the fluid outlet hole. The soft magnet cavity is arc-shaped or tile-like. The soft magnet cavity and the upper and lower surfaces of the soft magnet are horizontally provided with a plurality of guiding grooves.

In another aspect of the present invention, the two sides of the fluid inlet hole are interconnected to the soft magnet cavities on the corresponding two sides through the upper flow-split grooves. The two sides of the fluid outlet hole are interconnected to the soft magnet cavities on the corresponding two sides through the lower flow-split grooves. The two soft magnet cavities having no fluid inlet hole or fluid outlet hole between each other are interconnected through a limiting groove. The two sides of the fluid inlet pipe on the inner side of the accommodating cavity cover plate are provided with upper flow-split plates. The two sides of the fluid outlet pipe on the inner side of the accommodating cavity cover plate are provided with lower flow-split plates. The upper flow-split plate and the lower flow-split plate are disposed to correspond to the upper guiding groove and the lower guiding groove.

In another aspect of the present invention, the inner side surface of the accommodating cavity cover plate is provided with an even number groups of guiding columns. The even number of groups of guiding columns are correspondingly disposed to the even number of soft magnet cavities in a one-to-one. A plurality of guiding columns A is disposed at the bottom side of the soft magnet cavity. The guiding column group comprises a plurality of guiding columns B. The guiding columns A and the guiding columns B are correspondingly disposed.

In another aspect of the present invention, a step portion is provided, in which the soft magnet cavity and the limiting groove are connected. The depth of the soft magnet cavity is greater than that of the limiting groove, and the width of the soft magnet cavity is greater than that of the upper guiding groove, the lower guiding groove or the limiting groove.

In another aspect of the present invention, a guiding groove A is formed on the inner wall of the fluid valve chamber A, and a guiding groove B is formed on the inner wall of the fluid valve chamber B.

In another aspect of the present invention, the magnetic drive valve comprises a valve cover, a shell, a magnet and a valve rod. A valve body inlet is formed at one end of the shell, and the valve cover is correspondingly disposed on the outer side of the valve body inlet. The side surface of the shell is provided with a plurality of valve body outlets. The magnet is correspondingly disposed on the outer side of the other end of the shell. One end of the valve rod is firmly connected to the center of the bottom surface of the valve cover, and the other end of the valve rod is detachably connected to the magnet. The length of the valve rod is greater than that of the shell. The valve inlets of the two magnetic drive valves are respectively connected to the hot fluid valve port and the cold fluid valve port. The magnet is disposed to correspond to a plurality of external magnets.

In another aspect of the present invention, the magnetic drive valve comprises a magnet conductive cover. The bottom of the magnet conductive cover is provided with an accommodating hole. The center of the upper surface of the magnet conductive cover is provided with a through hole, which is interconnected to the accommodating hole. The magnet is disposed in the accommodating hole, and a fixing hole is provided on the magnet. An expansion column is disposed at the lower end of the valve rod. The expansion column, which is inserted through the through hole, is fixed in the fixing hole.

In another aspect of the present invention, a guiding sleeve is fixed in the center of the shell. The valve rod is slides into the guiding sleeve. The guiding sleeve is disposed in the shell through a plurality of supporting pieces, which are firmly connected between the outer wall of the guiding sleeve and the inner wall of the shell.

In another aspect of the present invention, the circumferential edge of the bottom surface of the valve cover is provided with a sealing bevel A, and the circumferential edge of the valve body inlet is provided with a sealing bevel B. The sealing bevel A is provided to correspond to the sealing bevel B. A silicon ring is disposed on the sealing bevel A or the sealing bevel B.

In another aspect of the present invention, the outer wall of the upper end of the shell is provided with an annular step portion. A connecting portion is formed between the annular step portion and the circumferential edge of the valve body inlet. The connecting portion of the two magnetic drive valves is inserted into and connected to the hot fluid valve port and the cold fluid valve port.

In another aspect of the present invention, the correcting mechanism A is disposed on the supporting side plate. The correcting mechanism A comprises an correcting column which is disposed at the upper end of the supporting side plate, and an correcting groove which is provided at the lower end of the supporting side plate. The correcting column is disposed to correspond to the correcting groove. The correcting column and the correcting groove are asymmetrically or irregularly disposed. The bottoms of the two sides of the correcting groove are on the same horizontal plane.

In another aspect of the present invention, a water system fixing groove is formed between the axle seat A and the two supporting beams of the upper end of the two supporting side plates. The bottom of the fixing groove is provided with a plurality of correcting locating grooves. A plurality of correcting recessed strips is disposed at the bottom of the support body. The correcting positioning grooves are provided to correspond to the correcting recessed strips.

In another aspect of the present invention, a mounting groove is provided at where the axle seat A and the upper end of one of the supporting side plates are connected. The mounting plate is fixed in the mounting groove.

In another aspect of the present invention, a detection hole is provided, in which the axle seat A and the lower end of at least one supporting side plate are connected.

Compared with the prior art, the present invention has the following advantages: The present invention effectively changes the arrangement of the stators and the rotor, enabling the soft magnets and the hard magnets, which are vertically arranged in parallel in the prior art, to be respectively located in two concentric circles. Consequently, the distance between the soft magnets and the hard magnets can be greatly decreased, and the cooling and heating effect can be sufficiently improved. Additionally, the present invention effectively changes the structure of the stator, allowing the heating or cooling fluid to directly contact the soft magnets in the stator. Thus, the heating and cooling effect and the thermal energy usage efficiency can be greatly enhanced.

DETAILED DESCRIPTION OF THE INVENTION

Drawings and detailed embodiments are combined hereinafter to elaborate the technical principles of the present invention.

Figure 1:
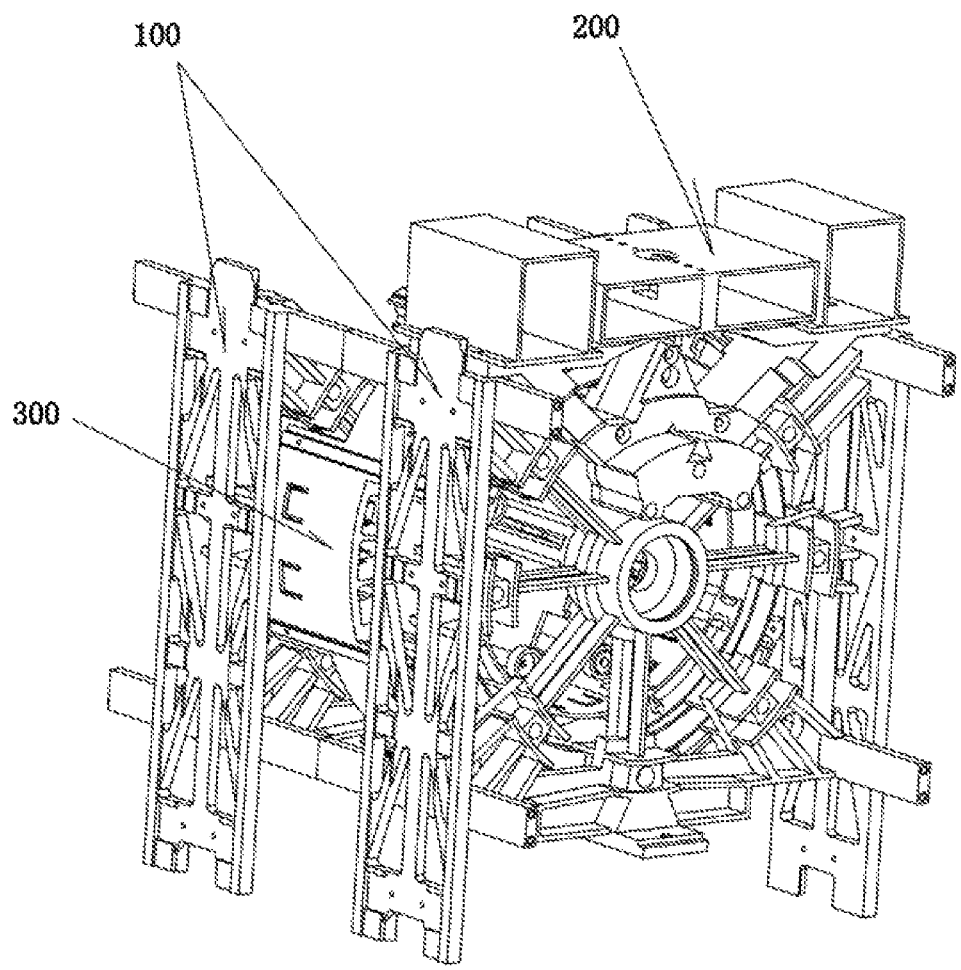
FIG. 1 is a schematic diagram of the whole assembling structure of the present invention.
Figure 2:
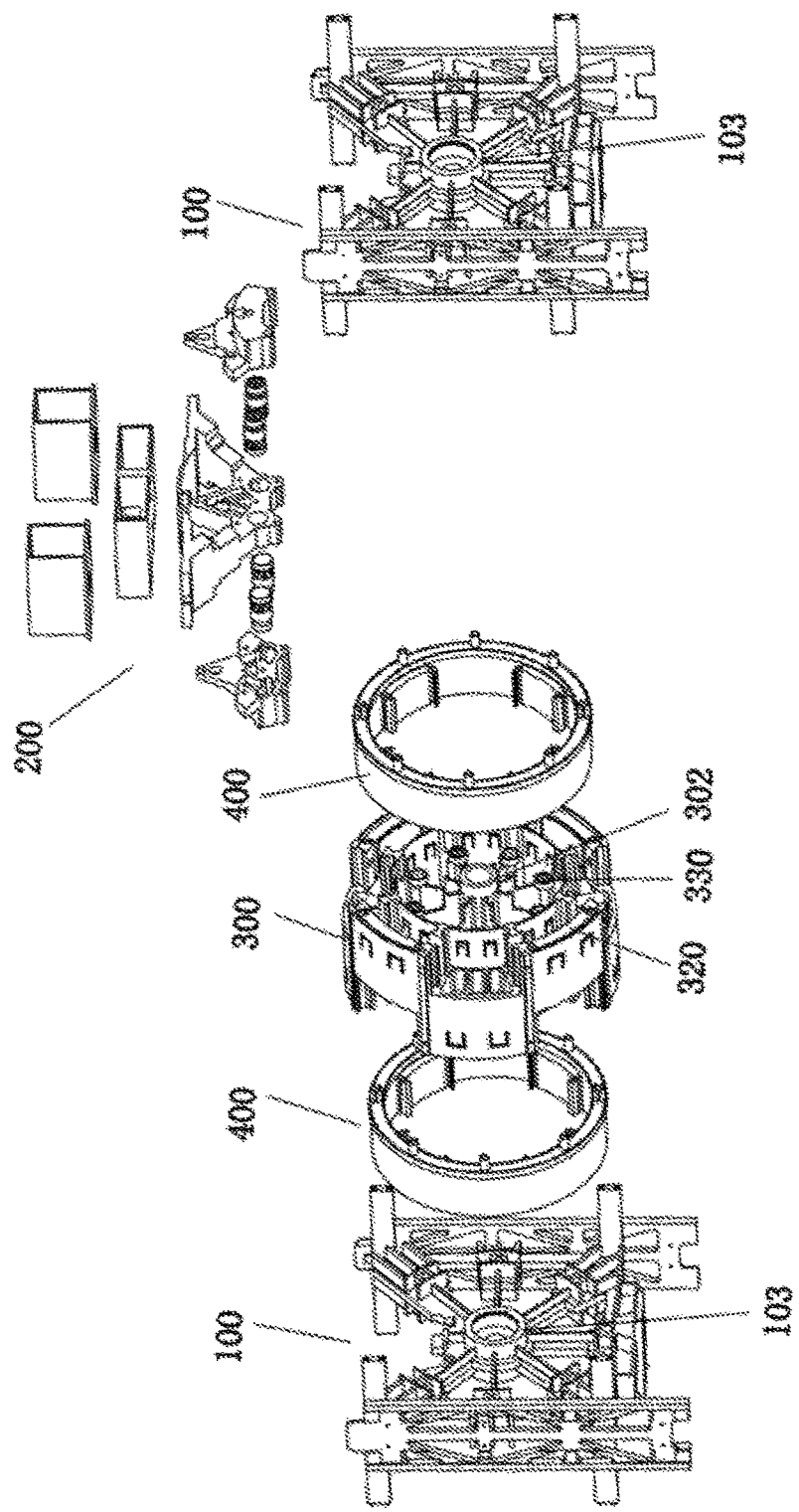
FIG. 2 is a breakdown structure diagram of the present invention.

As shown in FIGS. 1 and 2, the magneto-caloric power generation equipment comprises at least one magneto-caloric power generation unit. The magneto-caloric power generation unit comprises two supports 100 which are correspondingly connected, a rotor 300, two stators 400 and a heating and cooling device 200. The supports 100 are provided with an axle seat A 103, and the rotor 300 is provided with an axle seat B 302. An accommodating space is formed between the two supports 100, and the rotor 300 is disposed in the accommodating space. A dynamic rotation axle (not shown in the drawing) is inserted into the axle seat A 103 and the axle seat B 302, enabling the rotor 300 to rotate in the accommodating space. One end of the dynamic rotation axle is connected to the power generation equipment. The above is the main structure of the present invention.

Figure 3:
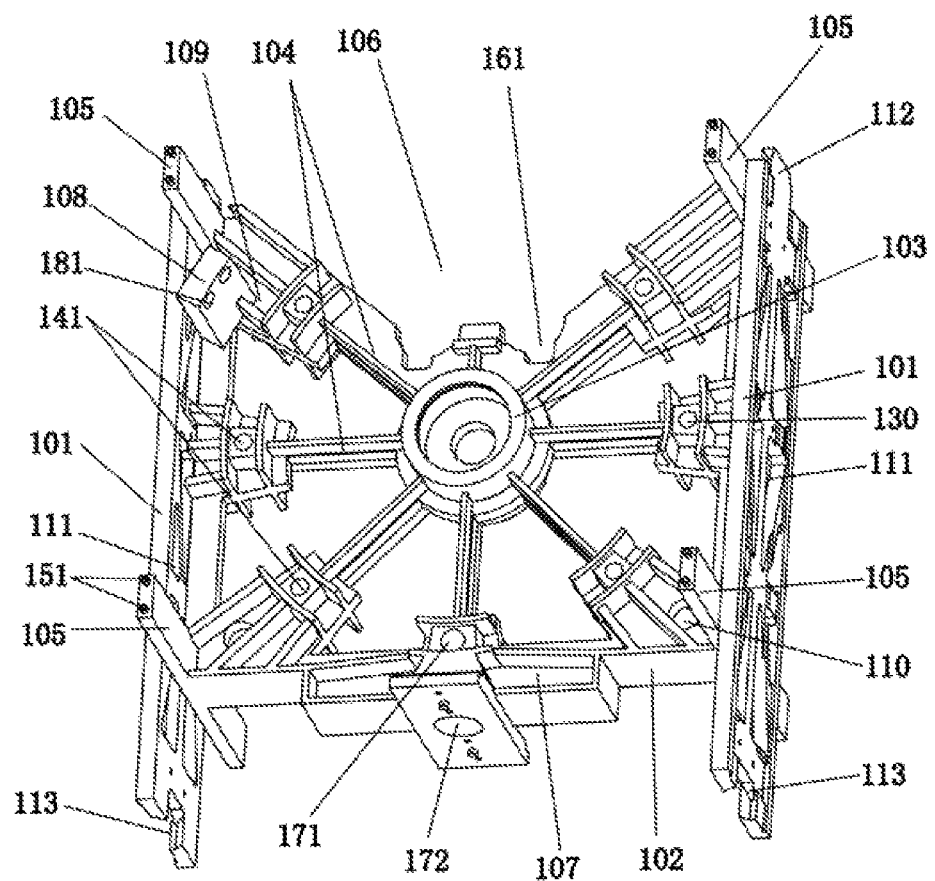
FIG. 3 is a structure diagram of the supports of the present invention.
Figure 4:
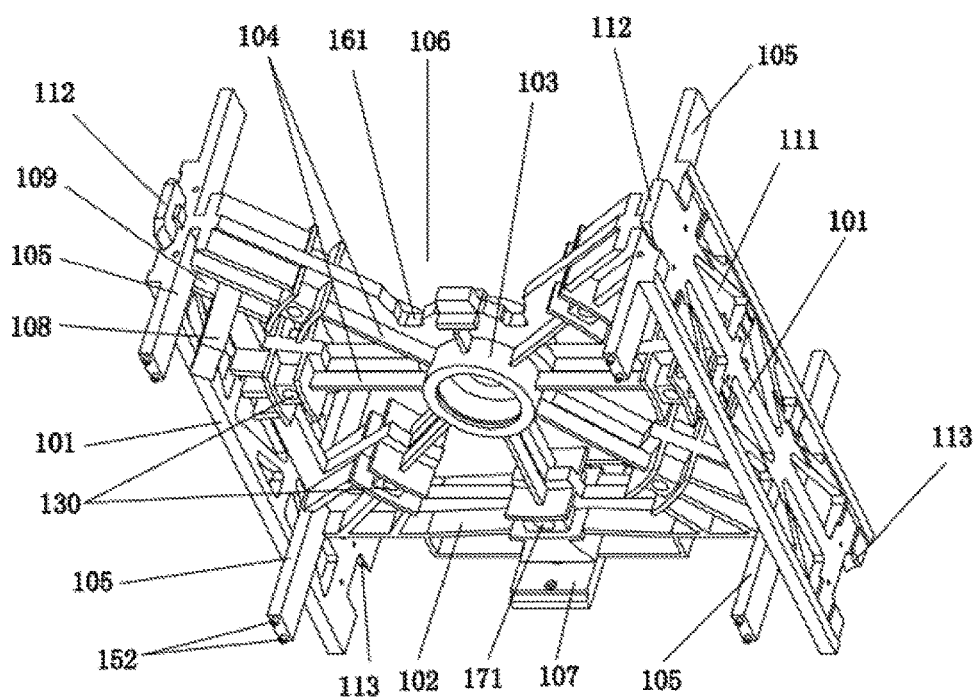
FIG. 4 is a structure diagram of the supports of the present invention from another viewing angle.

As shown in FIGS. 3 and 4, the support 100 is one of the main components of the present invention. The support 100 comprises two supporting side plates 101 and the axle seat A 103. The two side plates 101 are vertically disposed to correspond to each other. The bottoms of the two supporting side plates 101 are firmly connected through a connecting plate 102. The axle seat A 103 is disposed in the middle of the frame formed by the two supporting side plates 101 and the connecting plate 102. The axle seat A 103 is firmly connected to the supporting side plates 101 or the connecting plate 102 through a plurality of supporting beams 104. The upper part and the lower part of the inner side of the supporting side plates 101 are provided with connecting bridge plates 105 in horizontal direction. An correcting mechanism B is disposed on the connecting bridge plate 105. The correcting mechanism B comprises an alignment fixing hole 151 and an alignment fixing convex 152, which are respectively disposed at the two ends of the connecting bridge plate 105. The two supports 100 are connected through the connection between the alignment fixing hole 151 and the alignment fixing convex 152. The correcting mechanism B enables the present invention to be quickly connected in a horizontal direction, which can prevent the present invention from being mistakenly assembled so as to improve the assembling efficiency.

The support 100 is provided with a fixing groove 106, in which the heating and cooling device 200 is firmly disposed. Preferably, the fixing groove 106 is V-shaped and the main body of the heating and cooling device 200 is triangle-structured. Specifically, a water system fixing groove 106 is formed between the axle seat A 103 and the two supporting beams 104 of the upper end of the two supporting side plates 101. The bottom of the fixing groove 106 is provided with a plurality of correcting locating grooves 161. A plurality of correcting recessed strips 207 is disposed at the bottom of the support body 201 of the heating and cooling device 200. The correcting locating grooves 161 are provided to correspond to the correcting recessed strips 207. The other structural arrangement of the heating and cooling device is described hereinafter.

The correcting mechanism A is disposed on the supporting side plate 101. The correcting mechanism A comprises an correcting column 112 which is disposed at the upper end of the supporting side plate 101, and an correcting groove 113 which is provided at the lower end of the supporting side plate 101. The correcting column 112 is disposed to correspond to the correcting groove 113. The correcting column 112 and the correcting groove 113 are asymmetrically or irregularly disposed. The bottoms of the two sides of the correcting groove 113 are on the same horizontal plane. The correcting mechanism A enables the present invention to be quickly connected in a vertical direction, which can prevent the present invention from being mistakenly assembled so as to improve the assembling efficiency.

A mounting groove 109 is provided at where the axle seat A 103 and the upper end of one of the supporting side plates 101 are connected. A mounting plate 108 is fixed in the mounting groove 109.

A detection hole 110 is provided at the point where the axle seat A 103 and the lower end of at least one supporting side plates 101 are connected. When the present invention is horizontally connected through a plurality of magneto-caloric power generation units, the plurality of supports 100 are rowed up in parallel. Consequently, the plurality of detections holes forms a detection channel, enabling a detection device to be inserted into the detection channel. Thus, the problems of few magneto-caloric power generation units can be effectively detected, which greatly improves the detecting effect.

A plurality of weight-reducing holes is provided on the supporting side plate 101. According to this arrangement, the weight of the support 100 can be effectively reduced, which is convenient for the transportation and installation. Accordingly, the resource can be saved and the cost can be reduced.

Figure 5:
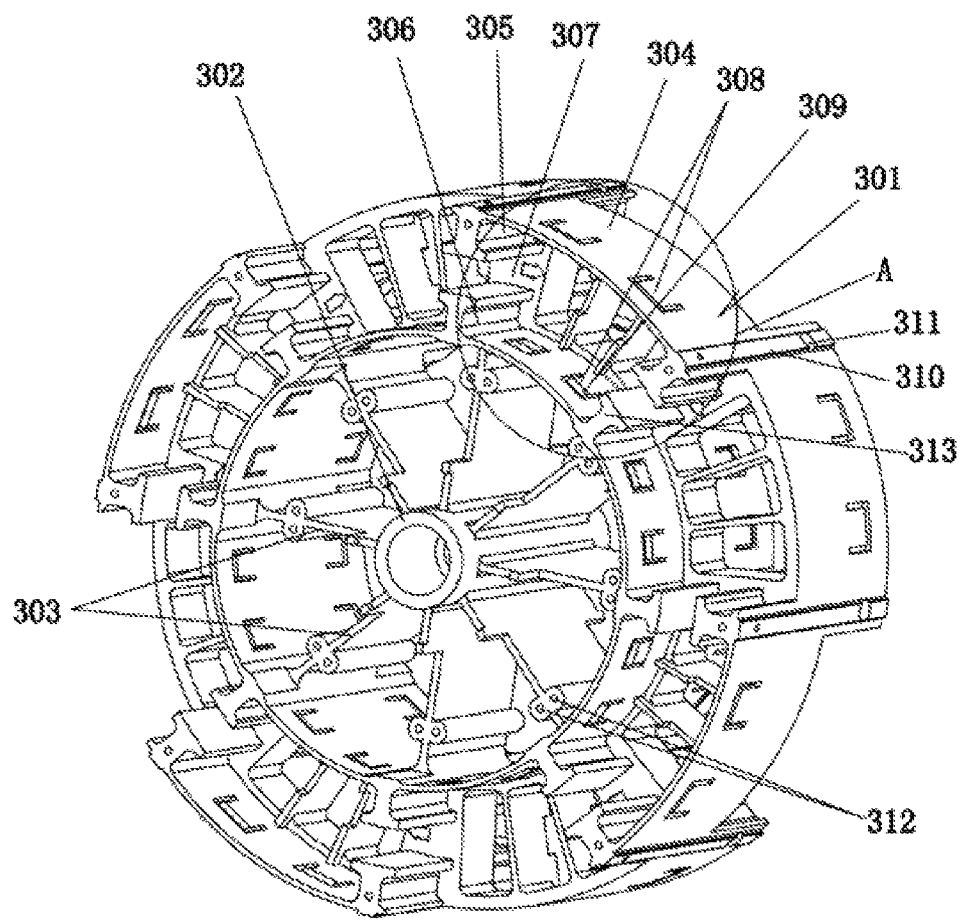
FIG. 5 is a structure diagram of the rotor of the present invention.
Figure 6:
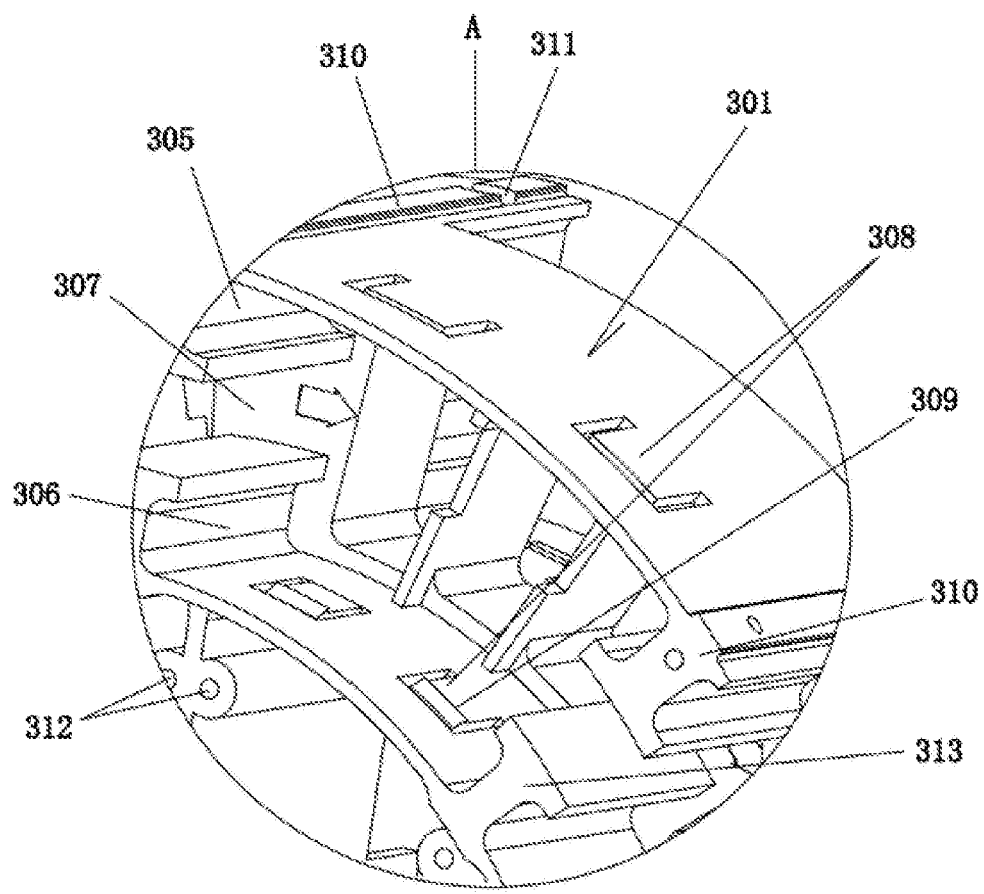
FIG. 6 is an enlarged structure diagram of part A in FIG. 5.

As shown in FIGS. 5 and 6, the rotor 300 comprises an annular support 301, which is concentric with the axle seat B 302. The axle seat B 302 is disposed on the annular support 301, and a plurality of supporting pieces 303 is disposed between the outer wall of the axle seat B 302 and the inner wall of the annular support 301. The two sides of the annular support 301 are provided with even number of groups of hard magnet fixing grooves 304. The hard magnet fixing grooves 304 of the two sides of the annular support 301 are provided in a staggered manner. Each group of hard magnet fixing grooves 304 is uniformly distributed on the annular support 301. The even groups of hard magnet fixing grooves 304 on the same side of the annular support 301 are provided with annular accommodating grooves. The hard magnet fixing grooves 304 are disposed hard magnets 320. Preferably, the two sides of the annular support 301 of the present invention are respectively provided with four groups of hard magnet fixing grooves 304. The angle between the two adjacent hard magnet fixing grooves 304 on the same side of the annular support 301 is 90 degrees, and the angle between any two in the eight groups of adjacent hard magnet fixing grooves 304 is 45 degrees.

Each group of the hard magnet fixing grooves 304 comprises an outer fixing groove 305 and an inner fixing groove 306, which are arc-shaped or tile-like. The outer fixing groove 305 and the inner fixing groove 306 are correspondingly provided with the hard magnets 320. An outer connecting bar 310 is disposed between any two adjacent outer fixing grooves 305, and an inner connecting bar 313 is disposed between any two adjacent inner fixing grooves 306. An accommodating space 307 is formed between the outer fixing grove 305 and the inner fixing groove 306. The annular accommodating groove is formed by the accommodating space 307 between the outer fixing grooves 305 and the inner fixing groove 306 on the same side of the annular support 301. The stators 400, which are provided with the soft magnet 403, can move in the annular accommodating grooves of the two sides of the annular support 301 relative to each other. According to this arrangement, the circumference on which the soft magnet 403 is located is between the circumference on which the hard magnet 320 in the outer fixing groove 305 is located and the circumference on which the inner fixing groove 306 is located. Compared with the prior art, the distance between the soft magnets 403 and the hard magnets 320 on the two sides of the soft magnet 403 can be greatly decreased. Meanwhile, the stability of the equipment can be greatly improved, which can effectively enhance the driving power of the soft magnets 403 and the hard magnets 320 so as to improve the power efficiency.

The outer side wall of the outer fixing groove 305 and the inner side wall of the inner fixing groove 306 are provided with locking elastic pieces 308. The inner side of the upper end part of the locking elastic piece 308 is provided with a locking hook 309. A magnet cover is covered on the exterior of the hard magnet 320. The outer edge of the magnetic cover is engaged with the locking hook 309. According to this arrangement, the fixation degree of the hard magnet 320 can be effectively improved, preventing the hard magnet 320 from dropping off during the rotating process of the rotor 300.

Figure 7:
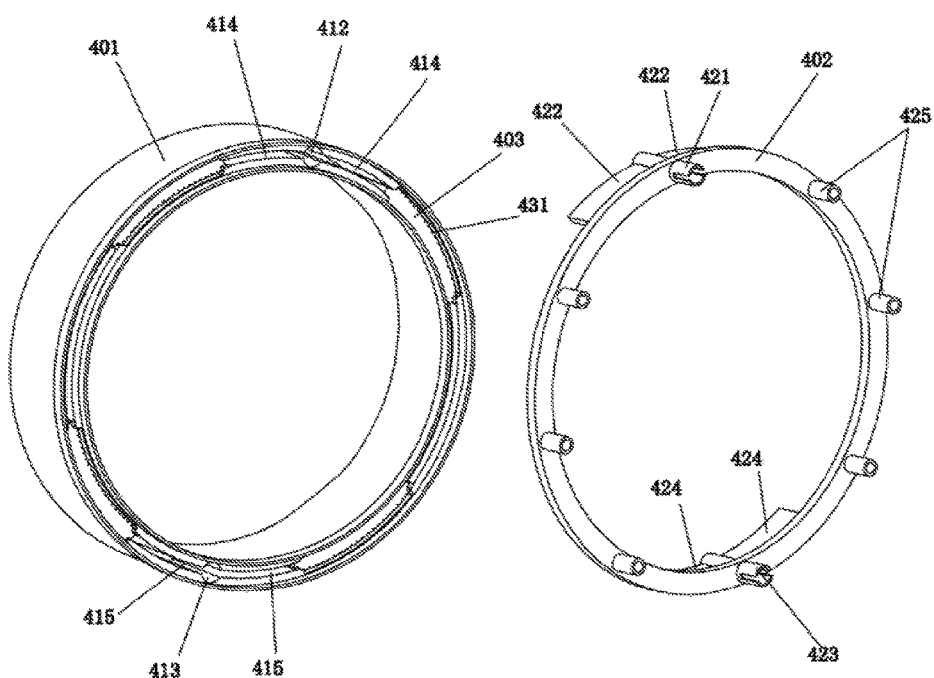
FIG. 7 is a breakdown structure diagram of the stator of the present invention.
Figure 8:
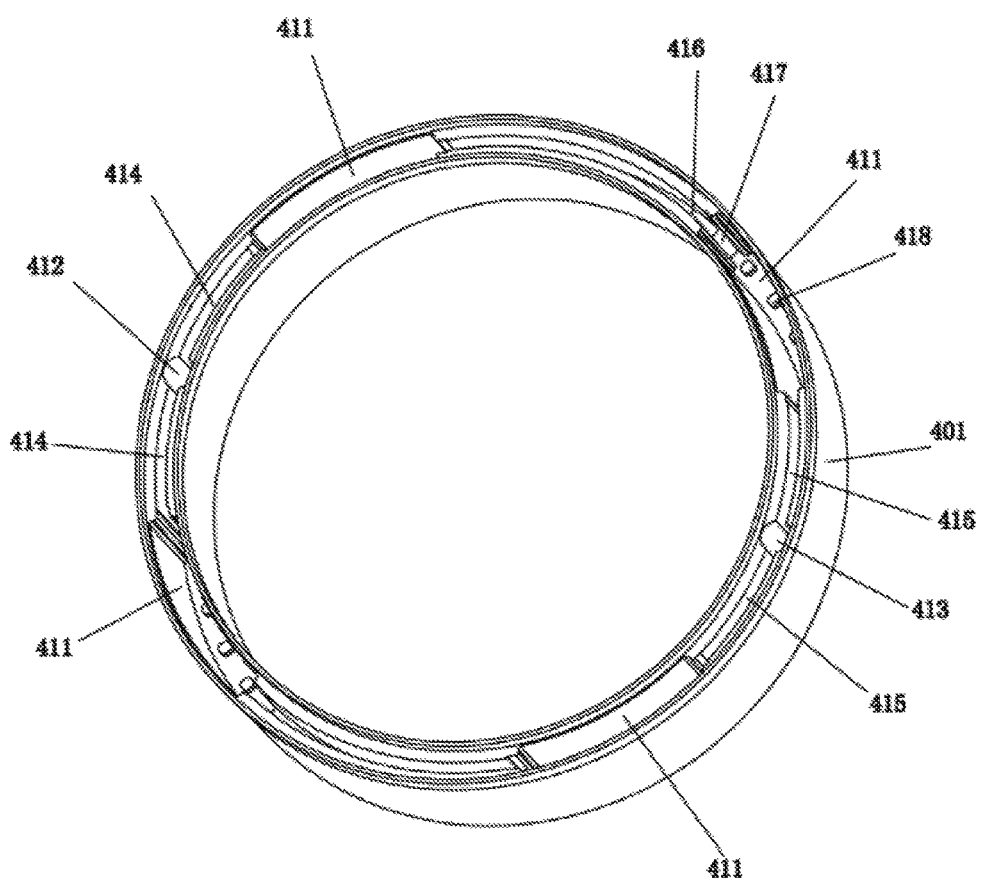
FIG. 8 is a structure diagram of the annular cavity of the stator of the present invention.
Figure 9:
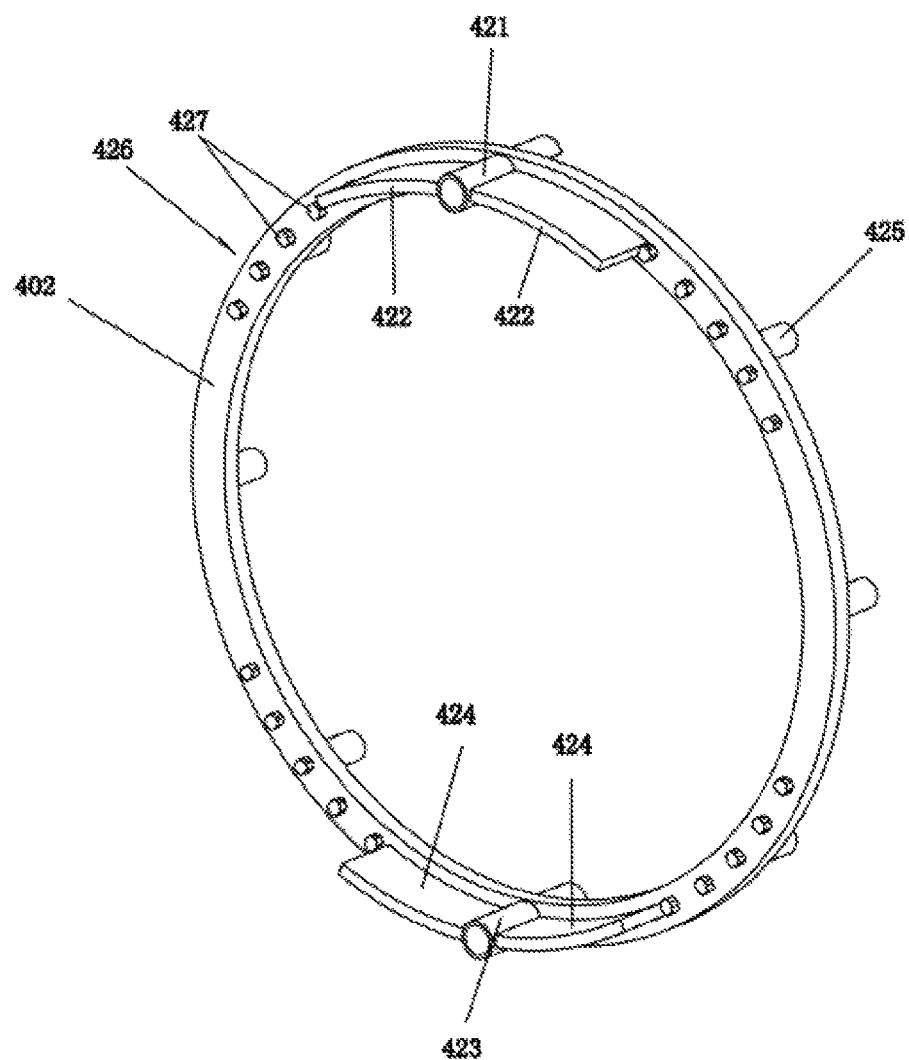
FIG. 9 is a structure diagram of the accommodating cavity cover plate of the stator of the present invention.
Figure 10:
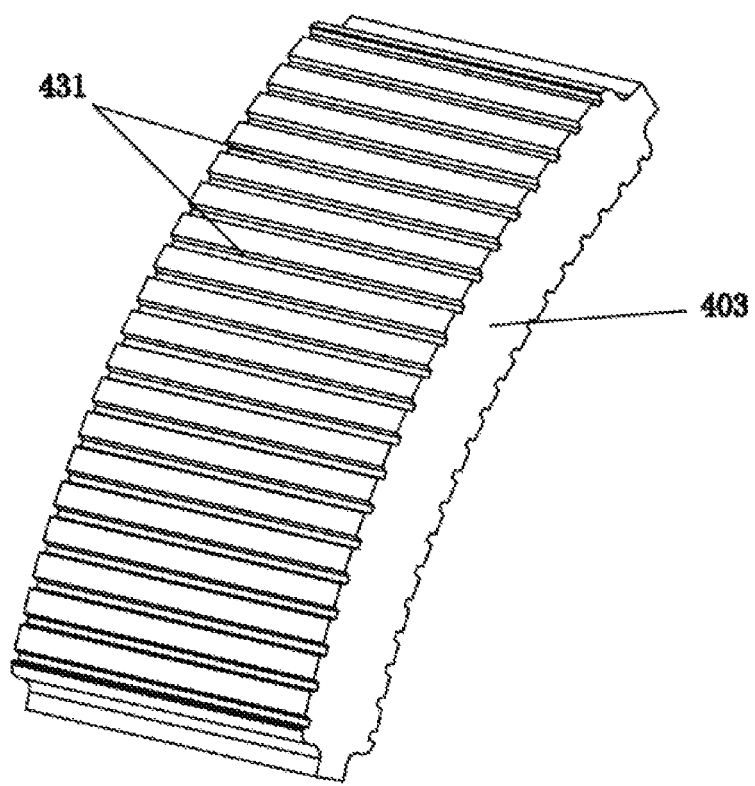
FIG. 10 is a structure diagram of the soft magnet of the stator of the present invention.
Figure 11:
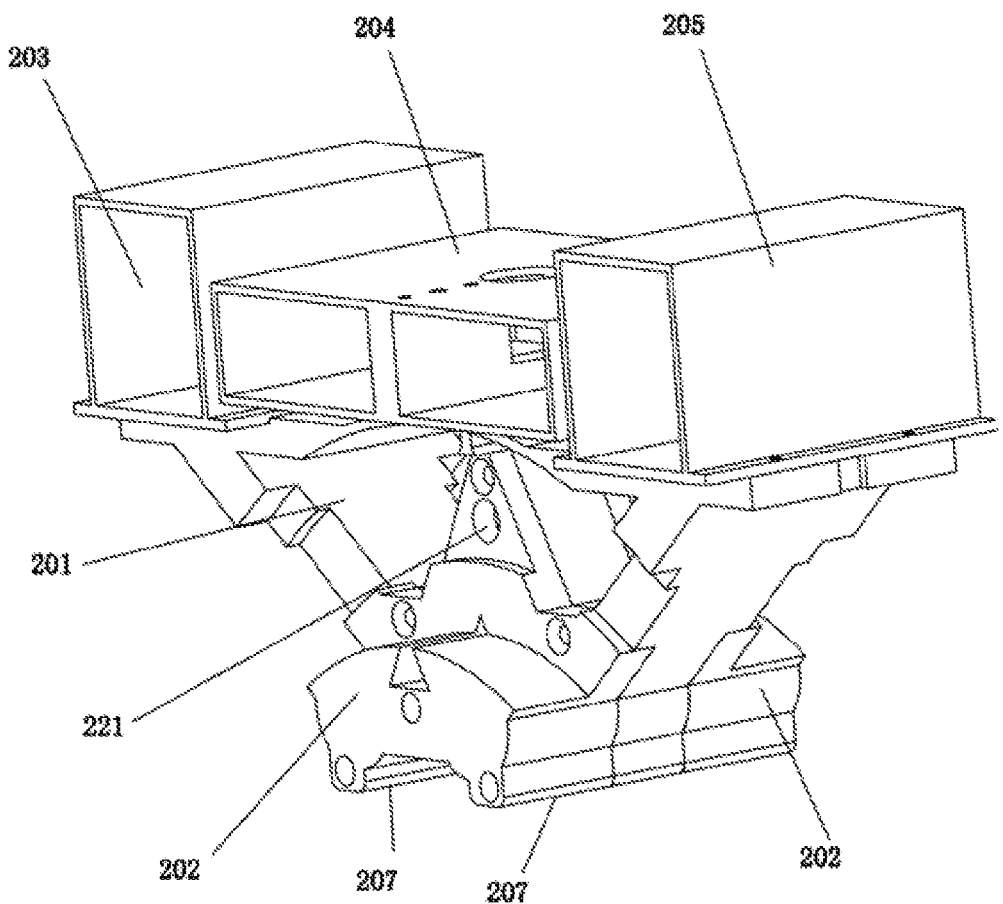
FIG. 11 is a structure diagram of the heating and cooling device of the present invention.
Figure 12:
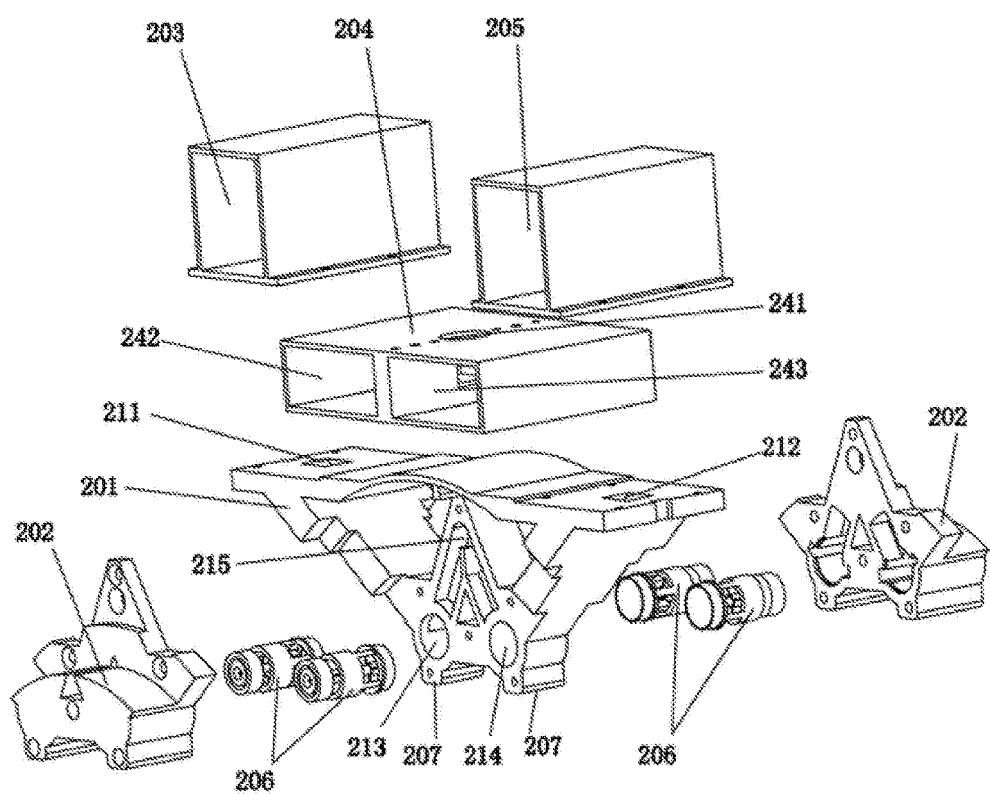
FIG. 12 is a breakdown structure diagram of the heating and cooling device of the present invention.
Figure 13:
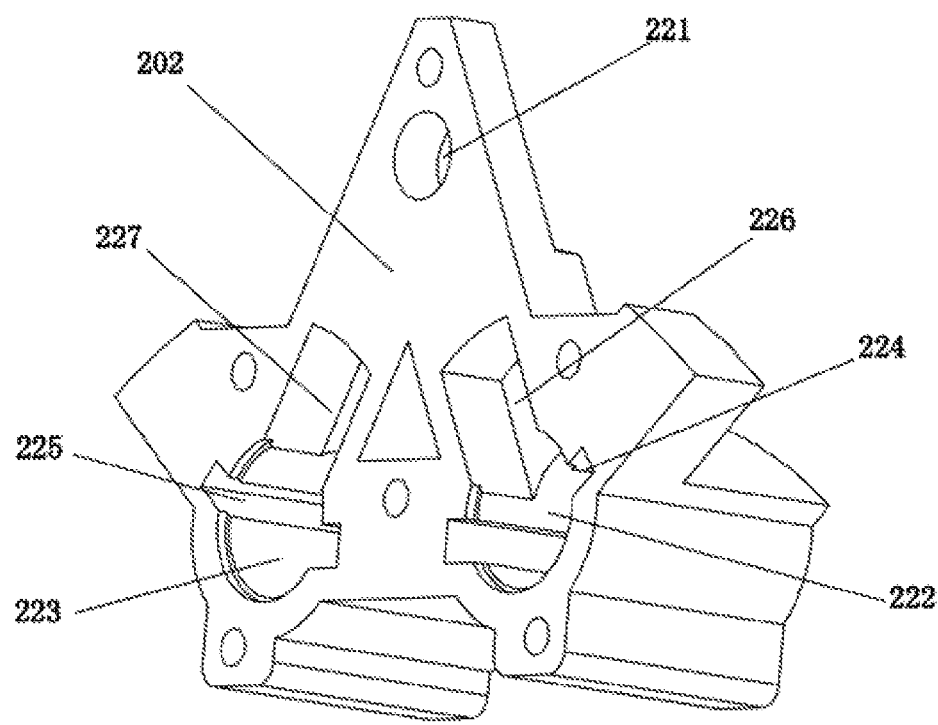
FIG. 13 is a structure diagram of the valve cover of the heating and cooling device of the present invention.
Figure 14:
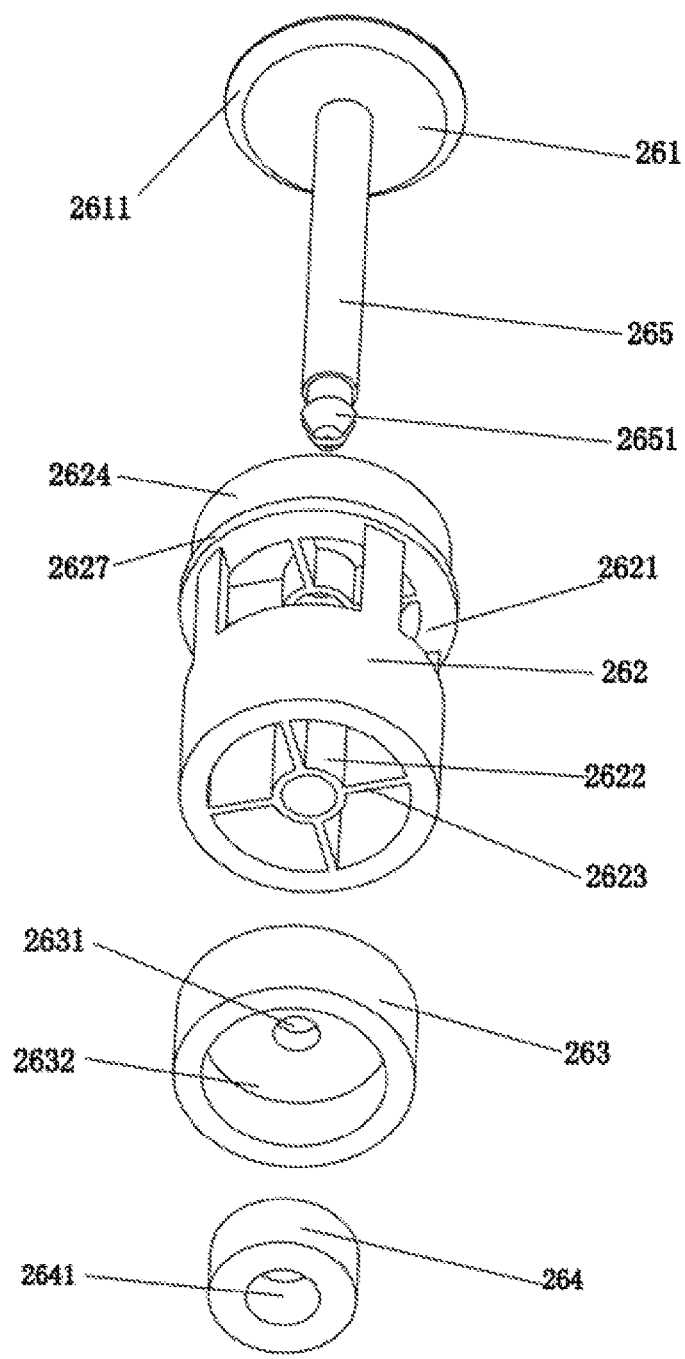
FIG. 14 is a breakdown structure diagram of the magnetic drive valve of the heating and cooling device of the present invention.
Figure 15:
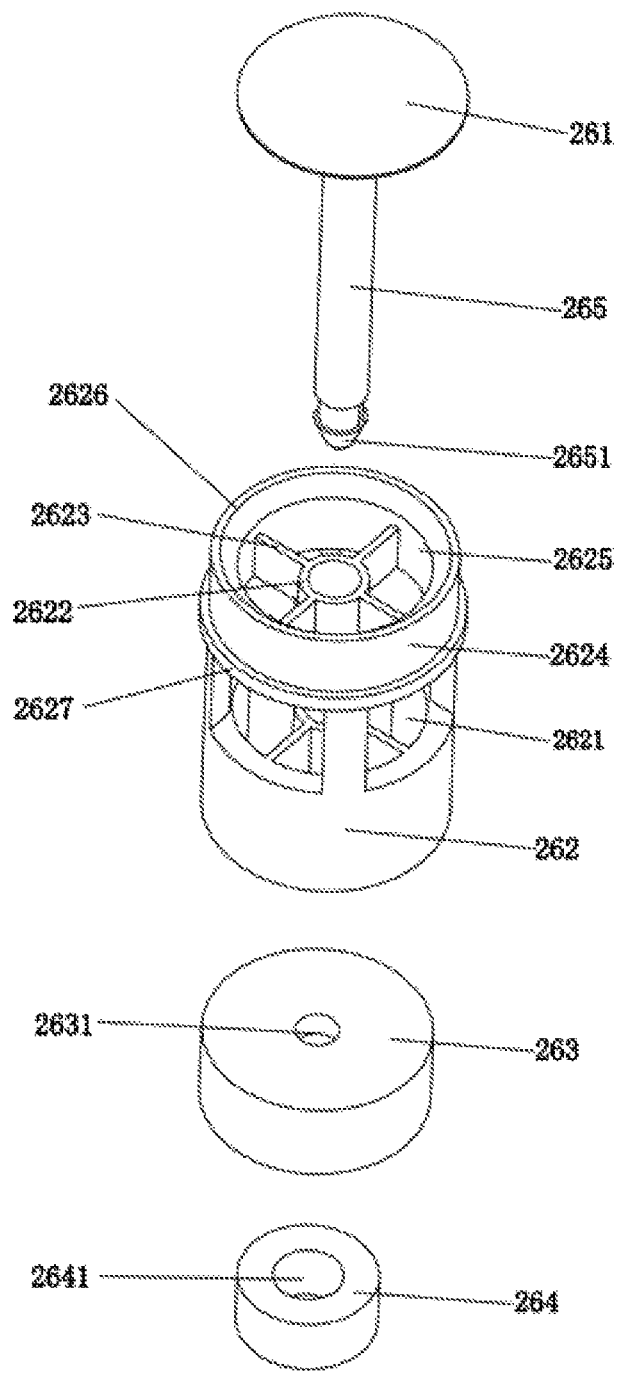
FIG. 15 is a breakdown structure diagram of the magnetic drive valve of the heating and cooling device of the present invention from anther viewing angle.

As shown in FIGS. 7 and 10, the stator 400 comprises an annular cavity 401, which has an opening on one side, and an accommodating cavity cover plate 402 which is corresponding to the opening of the annular cavity 401. An even number of soft magnet cavities 411 are uniformly distributed in the annular cavity 401. The soft magnet 403 is disposed in the soft magnet cavity 411. The number of the soft magnet cavities 411 is the same as that of the hard magnet fixing grooves 304 on one side of the annular support 301. There are preferably four soft magnet cavities. The accommodating cavity cover plate 402 is provided with a fluid inlet pipe 421 and a fluid outlet pipe 423, which are interconnected to the annular cavity 401. A fluid inlet hole 412 is provided between the two soft magnet cavities 411 at the upper part of the annular cavity 401, and a fluid outlet hole 413 is provided between the two soft magnet cavities 411 at the lower part of the annular cavity 401. The two sides of the fluid inlet hole 412 are interconnected to the soft magnet cavities 411 at the corresponding two sides through the upper flow-split grooves 414. The two sides of the fluid outlet hole 413 are interconnected to the soft magnet cavities 411 at the corresponding two sides through the lower flow-split grooves 415. The two soft magnet cavities 411 having no fluid inlet hole 412 or fluid outlet hole 413 between each other are interconnected through a limiting groove 416. The two sides of the fluid inlet pipe 421 on the inner side of the accommodating cavity cover plate 402 are provided with upper flow-split plates 422. The two sides of the fluid outlet pipe 423 on the inner side of the accommodating cavity cover plate 402 are provided with lower flow-split plates 424. The upper flow-split plate 422 and the lower flow-split plate 424 are disposed to correspond to the upper flow-split groove 414 and the lower flow-split groove 415.

The stator 400 is vertically disposed during use. When heating or cooling the soft magnet 403 in the soft magnet cavity 411 of the annular cavity 401, the heating or cooling fluid enters the fluid inlet pipe 421 through the fluid outlet 221 of the heating and cooling device 200 (namely, the fluid inlet pipe 421 is connected to the fluid outlet 221 of the corresponding heating and cooling device 200, and the detailed arrangement of the fluid outlet 221 is described hereinafter), then enters the annular cavity 401 through the fluid inlet hole 412. Afterwards, the heating or cooling fluid respectively enters the soft magnet cavities 411 on the two sides to directly heat or cool the soft magnet 403, then flow into the fluid discharging system from the two sides through the fluid outlet hole 413 and the fluid outlet pipe 423. This arrangement enables the heating fluid or cooling fluid to directly contact the soft magnet 403, which greatly improves the heating or cooling effect so as to enhance the energy conversion efficiency. It's important to clarify that the upper part and the lower part of the annular cavity 401 is a relative concept. The upper part and the lower part of the annular cavity 401 of the present invention can be interchanged from the functional aspect, which are used herein to clearly expound the fluid inlet pipe 421 and the fluid outlet pipe 423.

The inner side surface of the accommodating cavity cover plate 402 is provided with even number groups of guiding columns 426. The even number groups of guiding columns 426 are correspondingly disposed to the even number of soft magnet cavities 411 one to one. A plurality of guiding columns A 418 is disposed at the bottom side of the soft magnet cavity 411. The guiding column group 426 comprises a plurality of guiding columns B 427. The guiding columns A 418 and the guiding columns B 427 are correspondingly disposed. A plurality of guiding grooves 431 are horizontally provided on the upper and lower surfaces of the soft magnet 403. According to this arrangement, when the heating fluid or the cooling fluid enters the soft magnet cavity 411, the guiding column B 427 and the guiding column A 418 of the guiding column group 426 are correspondingly disposed to form a fluid cavity, guiding the heating fluid or the cooling fluid to horizontally flow through the soft magnet cavity 411. Consequently, the heating fluid or the cooling fluid horizontally flows through the guiding groove 431, greatly improving the heating or cooling effect.

A step portion 417 is provided at where the soft magnet cavity 411 and the limiting groove 416 are connected. The depth of the soft magnet cavity 411 is greater than that of the limiting groove 416, and the width of the soft magnet cavity 411 is greater than that of the upper guiding groove 414, the lower guiding groove 415 or the limiting groove 416. According to this arrangement, the flow direction of the heating fluid or the cooling fluid can be effectively controlled, enabling the heating fluid or the cooling fluid to form an S-shaped flow in the annual cavity 401. When entering the soft magnet cavity 411, the heating fluid or the cooling fluid horizontally flow through the guiding groove 431 on the upper and lower surfaces of the soft magnet 403. Thus, the heating fluid or the cooling fluid can sufficiently contact the soft magnet 403.

The two stators 400 are firmly disposed on the corresponding supports 100. Specifically, the outer end parts of the plurality of supporting beams 104 are provided with fixing connection holes 130. The outer side of the accommodating cavity cover plate 402 is provided with a plurality of fixing columns 425. The stator 400 is fixed on the support 100 through the cooperation between the fixing columns 425 and the fixing connection holes 130.

As shown in FIGS. 11 to 15, the heating and cooling device 200 comprises a support body 201. A valve cover 202 is correspondingly disposed on at least one side of the support body 201. The support body 201 is provided with a hot fluid pipe 203 and a cold fluid pipe 205. A hot fluid inlet 211, a cold fluid inlet 212, a hot fluid valve port 213, a cold fluid valve port 214 and a fluid outlet groove 215 are formed on the support body 201. The hot fluid pipe 203 is interconnected to the hot fluid inlet 211, and the hot fluid inlet 211 is interconnected to the hot fluid valve port 213. The cold fluid pipe 205 is interconnected to the cold fluid inlet 212, and the cold fluid inlet 212 is interconnected to the cold fluid valve port 214. A valve chamber A 222, a valve chamber B 223, an interconnecting groove A 226, an interconnecting groove B 227 and a fluid outlet 221 are formed on the valve cover 202. The fluid outlet 221 is interconnected to the fluid outlet groove 215. The fluid outlet groove 215 is interconnected to the valve chamber A 222 through the interconnecting groove A 226, and the fluid outlet groove 215 is interconnected to the valve chamber B 223 through the interconnecting groove B 227. The magnetic drive valves 206 are disposed in the valve chamber A 222 and the valve chamber B 223. The inlets of the two magnetic drive valves 206 are respectively connected to the hot fluid valve port 213 and the cold fluid valve port 214. The guiding grooves A 224 are provided on the inner wall of the fluid valve chamber A 222, and the guiding grooves B 225 are provided on the inner wall of the valve chamber B 223.

During use, the hot fluid and the cold fluid having a certain pressure are respectively injected into the hot fluid pipe 203 and the cold fluid pipe 205. Due to that the hot fluid pipe 203 is interconnected to the hot fluid valve port 213 through the hot fluid inlet 211, the hot fluid having a certain pressure is injected into the hot fluid valve port 213 so as to seal the magnetic drive valve 206; as well, due to that the cold fluid pipe 205 is interconnected to the cold fluid valve port 214 through the cold fluid inlet 212, the cold fluid having a certain pressure is injected into the cold fluid valve port so as to seal the magnetic drive valve 206. Namely, the initial state of the two magnetic drive valves 206 which are respectively connected to the hot fluid valve port 213 and the cold fluid valve port 214 is closed. When the magnetic drive valve 206 which is connected to the hot fluid valve port 213 is driven by the external magnet 330, the magnetic drive valve 206 is open. Consequently, the hot fluid can flow into the valve chamber A 222 through the magnetic drive valve 206, then flow into the fluid outlet groove 215 through the interconnecting groove A 226. Finally, the hot fluid flows into the stator of the magneto-caloric power generation equipment to heat the soft magnet through the fluid outlet 221. When the magnetic drive valve 206 which is connected to the cold fluid valve port 214 is driven by the external magnet 330, the magnetic drive valve 206 is open. Consequently, the cold fluid can flow into the valve chamber B 223 through the magnetic drive valve 206, then flow into the fluid outlet groove 215 through the interconnecting groove B 227. Finally, the cold fluid flows into the stator of the magneto-caloric power generation equipment to cool the soft magnet through the fluid outlet 221. It's important to clarify that the hot fluid and the cold fluid of the heating and cooling device 200 on one side of the stator share one fluid outlet 221. Finally, either one magnetic drive valve 206 is in closed state and the other is in open state, or both of the two magnetic drive valves 206 are in closed state. Namely, one stator 400 is either in heating state or in cooling state.

The magnetic drive valve 206 comprises a valve cover 261, a shell 262, a magnet 264 and a valve rod 265. A valve body inlet 2625 is formed at one end of the shell 262, and the valve cover 261 is correspondingly disposed on the outer side of the valve body inlet 2625. The side surface of the shell 262 is provided with a plurality of valve body outlets 2621. The magnet 264 is correspondingly disposed on the outer side of the other end of the shell 262. One end of the valve rod 265 is firmly connected to the center of the bottom surface of the valve cover 261, and the other end of the valve rod 265 is detachably connected to the magnet 264. The length of the valve rod 265 is greater than that of the shell 262. The valve inlets 2625 of the two magnetic drive valves 206 are respectively connected to the hot fluid valve port 213 and the cold fluid valve port 214. The magnet 264 is disposed to correspond to a plurality of external magnets 330.

The magnetic drive valve 206 further comprises a magnet conductive cover 263. The bottom of the magnet conductive cover 263 is provided with an accommodating hole 2632. The center of the upper surface of the magnet conductive cover 263 is provided with a through-hole 2631, which is interconnected to the accommodating hole 2632. The magnet 264 is disposed in the accommodating hole 2632, and a fixing hole 2641 is provided on the magnet 264. An expansion column 2651 is disposed at the lower end of the valve rod 265. The expansion column 2651, which is inserted through the through hole 2631, is fixed in the fixing hole 2641. In the magnetic drive valve 206 of the present invention, the magnet conductive cover 263 is disposed on the exterior of the magnet 264, which can effectively concentrate the magnetic lines and strengthen the driving power between the external magnets. Additionally, the magnetic drive valve 206 firmly connects the lower end of the valve rod 265 to the magnet 264 through the expansion column 261, which can realize a detachable connection.

A guiding sleeve 2622 is fixed in the center of the shell 262. The valve rod 265 is slidably disposed in the guiding sleeve 2622. The guiding sleeve 2622 is disposed in the shell 262 through a plurality of supporting pieces 2623, which are firmly connected between the outer wall of the guiding sleeve 2622 and the inner wall of the shell 262. According to this arrangement, the valve rod 265 can be effectively prevented from swinging during the upward and downward movement, which greatly improves the magnetic driving effect. More importantly, the sealing degree of the valve cover 261 and the valve inlet 2625 can be greatly improved.

The circumferential edge of the bottom surface of the valve cover 261 is provided with a sealing bevel A 2611, and the circumferential edge of the valve body inlet 2625 is provided with a sealing bevel B 2626. The sealing bevel A 2611 is provided to correspond to the sealing bevel B 2626. A silicon ring is disposed on the sealing bevel A 2611 or the sealing bevel B 2626. According to this arrangement, the sealing degree of the valve cover 261 and the valve inlet 2625 can be greatly increased.

The outer wall of the upper end of the shell 262 is provided with an annular step portion 2627. A connecting portion 2624 is formed between the annular step portion 2627 and the circumferential edge of the valve body inlet 2625. The connecting portion 2624 of the two magnetic drive valves 206 is inserted into and connected to the hot fluid valve port 213 and the cold fluid valve port 214, enabling the shell 262 to conveniently connect to the other components.

All components of the present invention have been respectively described in details above. Moreover, a detailed description is combined hereinafter to elaborate the technical solution, helping the skilled in this field to thoroughly understand the present invention.

A connecting base 107 is disposed on the connecting plate 102. The support body 201 is provided with fluid return pipe 204. The fluid discharging system is formed by the connecting base 107 and the fluid return pipe 204. The upper part of the connecting base 107 is provided with a fluid inlet 171, and the lower part of the connecting base 107 is provided with a fluid outlet 172. The fluid outlet pipe 423 is connected to the fluid inlet 171. The fluid return pipe 204 is provided with a return fluid inlet 241. A high temperature fluid return pipe 242 and a low temperature fluid return pipe 243 are provided in the fluid return pipe 204 in parallel. The return fluid inlet 241 is respectively interconnected to the high temperature fluid return pipe 242 and the low temperature fluid return pipe 243. A temperature control valve is disposed in the return fluid inlet 241, and the temperature control valve is provided with an inlet, an outlet A and an outlet B. The outlet A and the outlet B are respectively interconnected to the high temperature fluid return pipe 242 and the low temperature fluid return pipe 243. The fluid outlet pipe 423 is connected to the fluid inlet 171.

After assembling all of the components of the present invention, the annular accommodating grooves on the two sides of the rotor 300 are respectively provided with a stator 400, and the supports on the two sides of the rotor 300 are respectively provided with a heating and cooling device 200. The fluid outlet 221 of the heating and cooling device 200 is connected to the fluid inlet pipe 421 on the corresponding side of the stator 400. The two sides of the upper part of the supporting piece 303 are respectively provided with two fixing holes B 312, which are symmetrically provided. The fixing holes B 312 of the plurality of supporting pieces 303 are on the same circumference. An external magnet 330 is disposed on the fixing hole B 312. The plurality of external magnets, which have the same circumference, are disposed to correspond to the two magnetic drive valves 206 in the heating and cooling device 200 (specifically, the external magnets are correspondingly disposed to the magnets 264 in the magnetic drive valve 206). One of the two magnetic drive valves 206 in one heating and cooling device 200 controls the hot fluid, and the other controls the cold fluid. Meanwhile, the heating and cooling devices 200 on the two sides are correspondingly disposed; consequently, the magnetic drive valve 206 controlling the hot fluid of the heating and cooling device on one side is correspondingly disposed to the magnetic drive valve 206 controlling the cold fluid of the heating and cooling device 200 on the other side. When one of the supporting pieces 303 rotates to the middle of the two magnetic drive valves 206, the external magnets on the two sides of the supporting piece 303 simultaneously drive and open the magnetic drive valves 206 on the two sides. Consequently, one of the magnetic drive valves 206 is injected with hot fluid, and the other is injected with cold fluid. Namely, one of the two stators 400 on the two sides is in a heating state, and the other is in a cooling state. The two states are alternated to propel the rotor 300 to rotate, enabling the rotor 300 to propel the dynamic rotation shaft to do work. Thus, the power can be generated by the power generation equipment.

Each outer connecting bar 310 is provided with a fixing hole A 311. All of the fixing holes A 311 have the same circumference. The outer end of the supporting piece 303 is fixed on the inner connecting bar 313. The resident dynamic magnet is provided in the fixing hole A 311 (not shown in the drawing). The mounting plate 108 is disposed on the support 100, and the mounting hole 181 is provided on the mounting plate 108. The resident static magnet is disposed in the mounting hole 181 (not shown in the drawing), and the resident dynamic magnet is disposed to correspond to the resident static magnet. According to this arrangement, the power output efficiency of the present invention can be effectively improved, and the low power output can be shielded. Specifically, the rotor is initially stopped, and the resident static magnet having the mounting hole 181 is disposed to correspond to one of the resident dynamic magnets on the rotor 300. A certain attraction force is existed between the resident static magnet and the resident dynamic magnet. When the two heating and cooling devices 200 respectively heat and cool the soft magnets in the two stators 400, both of them have a heating and cooling process. When removing the resident static magnet and the resident dynamic magnet, the rotor 300 immediately starts to rotate once the driving force between the soft magnet and the hard magnet on the cooling side is slightly greater than that on the heating side, resulting in a very small rotation force and a very low efficiency rate. According to the arrangement of the resident static magnet and the resident dynamic magnet of the present invention, the rotation of the rotor can be effectively postponed. The rotor 300 can start to rotate only when the driving force between the soft magnet and the hard magnet on the cooling side is greater than the sum of that between the soft magnet and the hard magnet on the heating side and that between the resident static magnet and the resident dynamic magnet. At the moment, the driving force between the soft magnet and the hard magnet on the cooling side is greater, which can achieve a higher efficiency rate. When the next resident dynamic magnet is about to close to the resident static magnet, the resident static magnet can impose a pulling force on the resident dynamic magnet, effectively improving the efficiency rate.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A magneto-caloric power generation machine, comprising: at least one magneto-caloric power generation unit, wherein the magneto-caloric power generation unit further comprising:
    two supports which are correspondingly connected;
    a rotor;
    two stators; and
    a heating and cooling device, wherein the supports are provided with an axle seat A, and the rotor is provided with an axle seat B, wherein an accommodating space is formed between the two supports, and the rotor is disposed in the accommodating space, wherein a dynamic rotation axle is inserted into the axle seat A and the axle seat B, enabling the rotor to rotate in the accommodating space, wherein one end of the dynamic rotation axle is connected to the power generation equipment, wherein the heating and cooling device is fixed on the supports, wherein the rotor comprises an annular support, which is concentric with the axle seat B, wherein the axle seat B is disposed in the annular support, and a plurality of supporting pieces is disposed between the outer wall of the axle seat B and the inner wall of the annular support, wherein the two sides of the annular support are provided with an even number of groups of hard magnet fixing grooves, wherein the hard magnet fixing grooves of the two sides of the annular support are configured in a staggered manner, wherein each group of hard magnet fixing grooves is uniformly distributed on the annular support, wherein the even groups of hard magnet fixing grooves on the same side of the annular support are provided with annular accommodating grooves, wherein the hard magnet fixing grooves are provided with hard magnets, wherein the two stators, which can move towards each other, are disposed in the accommodating grooves of the two sides of the annular support, wherein the two stators are respectively fixed on the corresponding support, wherein the stator comprises an annular cavity which has an opening on one side, and a cover plate corresponding to the opening of the annular cavity, wherein an even number of soft magnet cavities are uniformly distributed in the annular cavity, wherein the number of the soft magnet cavities is the same as that of the hard magnet fixing grooves on one side of the annular support, wherein the soft magnet cavities are provided with soft magnets, wherein the accommodating cavity cover plate is provided with a fluid inlet pipe and a fluid outlet pipe, which are interconnected to the annular cavity, wherein the fluid inlet pipe is connected to the corresponding fluid outlet of the heating and cooling device, wherein the fluid outlet pipes of the two stators are connected to the fluid discharging system.

2. The magneto-caloric power generation machine of claim 1, wherein each group of the hard magnet fixing grooves of the rotor comprises an outer fixing groove and an inner fixing groove, which are arc-shaped or tile-like, wherein the outer fixing groove and the inner fixing groove are correspondingly provided with the hard magnets, wherein an outer connecting bar is disposed between any two adjacent outer fixing grooves, and an inner connecting bar is disposed between any two adjacent inner fixing grooves, wherein an accommodating space is formed between the outer fixing grove and the inner fixing groove, wherein the annular accommodating groove is formed by the accommodating space between the outer fixing grooves and the inner fixing groove on the same side of the annular support.

3. The magneto-caloric power generation equipment of claim 2, wherein each outer connecting bar is provided with a fixing hole A, wherein all of the fixing holes A are on the same circumference, wherein the outer end of the supporting piece is fixed on the inner connecting bar, wherein a resident dynamic magnet is provided in the fixing hole A, wherein a mounting plate is disposed on the support, and a mounting hole is provided on the mounting plate, wherein a resident static magnet is disposed in the mounting hole, and the resident dynamic magnet is disposed to correspond to the resident static magnet.

4. The magneto-caloric power generation machine of claim 3, wherein the two sides of the upper part of the support piece are provided with two fixing holes B, which are configured symmetrically, wherein the fixing holes B, which are provided on the plurality of supporting pieces, are on the same circumference, wherein an external magnet is disposed on the fixing hole B, wherein the heating and cooling device comprises a support body, wherein a valve cover is correspondingly disposed on at least one side of the support body, wherein the support body is provided with a hot fluid pipe and a cold fluid pipe, wherein a hot fluid inlet, a cold fluid inlet, a hot fluid valve port, a cold fluid valve port and a fluid outlet groove are formed in the support body, wherein the hot fluid pipe is interconnected to the hot fluid inlet, and the hot fluid inlet is interconnected to the hot fluid valve port, wherein the cold fluid pipe is interconnected to the cold fluid inlet, and the cold fluid inlet is interconnected to the cold fluid valve port, wherein a valve chamber A, a valve chamber B, an interconnecting groove A, an interconnecting groove B and a fluid outlet are formed on the valve cover, wherein the fluid outlet is interconnected to the fluid outlet groove, wherein the fluid outlet groove is interconnected to the valve chamber A through the interconnecting groove A, and the fluid outlet groove is interconnected to the valve chamber B through the interconnecting groove B, wherein the valve chamber A and the valve chamber B are provided with magnetic drive valves, wherein the inlets of the two magnetic drive valves are respectively connected to the hot fluid valve port and the cold fluid valve port, wherein the plurality of external magnets is disposed to correspond to the two magnetic drive valves.

5. The magneto-caloric power generation equipment of claim 4, wherein the support comprises two supporting side plates and the axle seat A, wherein the two side plates are vertically disposed to correspond to each other, wherein the bottoms of the two supporting side plates are firmly connected through a connecting plate, wherein the axle seat A is disposed in the middle of the frame formed by the two supporting side plates and the connecting plate, wherein the axle seat A is firmly connected to the supporting side plates or the connecting plate through a plurality of supporting beams, wherein the upper part and the lower part of the inner side of the supporting side plates are provided with connecting bridge plates in a horizontal direction, wherein an correcting mechanism B is disposed on the connecting bridge plate, wherein the correcting mechanism B comprises an alignment fixing hole And an alignment fixing convex, which are respectively disposed at the two ends of the connecting bridge plate, wherein the two supports are connected through the connection between the alignment fixing hole and the alignment fixing convex, wherein a fixing groove is provided on the support, and the heating and cooling device is firmly disposed in the fixing groove.

6. The magneto-caloric power generation equipment of claim 5, wherein the outer end parts of the plurality of supporting beams are provided with fixing connection holes, wherein the outer side of the accommodating cavity cover plate is provided with a plurality of fixing columns, wherein the stator is fixed on the support through the interaction of the fixing columns and the fixing connection holes.

7. The magneto-caloric power generation equipment of claim 6, wherein a connecting base is disposed on the connecting plate, wherein the support body is provided with a fluid return pipe, wherein the fluid discharging system is formed by the connecting base and the fluid return pipe, wherein the upper part of the connecting base is provided with a fluid inlet, and the lower part of the connecting base is provided with a fluid outlet, wherein the fluid outlet pipe is connected to the fluid inlet, wherein the fluid return pipe is provided with a return fluid inlet, wherein a high temperature fluid return pipe and a low temperature fluid return pipe are provided in the fluid return pipe in parallel, wherein the return fluid inlet is respectively interconnected to the high temperature fluid return pipe and the low temperature fluid return pipe, wherein a temperature control valve is disposed in the return fluid inlet, and the temperature control valve is provided with an inlet, an outlet A and an outlet B, wherein the outlet A and the outlet B are respectively interconnected to the high temperature fluid return pipe and the low temperature fluid return pipe.

8. The magneto-caloric power generation equipment of claim 7, wherein the outer side wall of the outer fixing groove and the inner side wall of the inner fixing groove are provided with locking elastic pieces, wherein the inner side of the upper end part of the locking elastic piece is provided with a locking hook, wherein a magnet cover is covered on the exterior of the hard magnet, wherein the outer edge of the magnetic cover is engaged with the locking hook.

9. The magneto-caloric power generation machine of claim 7, wherein a fluid inlet hole is provided between the two soft magnet cavities at the upper part of the annular cavity, and a fluid outlet hole is provided between the two soft magnet cavities at the lower part of the annular cavity, wherein the fluid inlet hole and the fluid outlet hole are interconnected to the soft magnet cavities on the two sides, wherein the two adjacent magnetic cavities having no fluid inlet hole or fluid outlet hole between each other are interconnected, wherein the accommodating cavity cover plate is annular-shaped, wherein the fluid inlet pipe and the fluid outlet pipe are inserted into the accommodating cavity cover plate, wherein the fluid inlet pipe and the fluid outlet pipe are respectively disposed to correspond to the fluid inlet hole and the fluid outlet hole, wherein the soft magnet cavity is arc-shaped or tile-like, wherein the soft magnet cavity and the upper and lower surfaces of the soft magnet are horizontally provided with a plurality of guiding grooves.

10. The magneto-caloric power generation machine of claim 9, wherein the two sides of the fluid inlet hole are interconnected to the soft magnet cavities at the corresponding two sides through the upper flow-split grooves, wherein the two sides of the fluid outlet hole are interconnected to the soft magnet cavities at the corresponding two sides through the lower flow-split grooves, wherein the two soft magnet cavities having no fluid inlet hole or fluid outlet hole between each other are interconnected through a limiting groove, wherein the two sides of the fluid inlet pipe on the inner side of the accommodating cavity cover plate are provided with upper flow-split plates, wherein the two sides of the fluid outlet pipe on the inner side of the accommodating cavity cover plate are provided with lower flow-split plates, wherein the upper flow-split plate and the lower flow-split plate are disposed to correspond to the upper guiding groove and the lower guiding groove.

11. The magneto-caloric power generation equipment of claim 10, wherein the inner side surface of the accommodating cavity cover plate is provided with even number groups of guiding columns, wherein the even number groups of guiding columns are correspondingly disposed to the even number of soft magnet cavities in a one-to-one configuration, wherein a plurality of guiding columns A is disposed at the bottom side of the soft magnet cavity, wherein the guiding column group comprises a plurality of guiding columns B, wherein the guiding columns A and the guiding columns B are correspondingly disposed.

12. The magneto-caloric power generation equipment of claim 11, wherein a step portion is provided, in which the soft magnet cavity and the limiting groove are connected, wherein the depth of the soft magnet cavity is greater than that of the limiting groove, and the width of the soft magnet cavity is greater than that of the upper guiding groove, the lower guiding groove or the limiting groove.

13. The magneto-caloric power generation equipment of claim 7, wherein a guiding groove A is formed on the inner wall of the fluid valve chamber A, and a guiding groove B is formed on the inner wall of the fluid valve chamber B.

14. The magneto-caloric power generation equipment of claim 13, wherein the magnetic drive valve comprises a valve cover, a shell, a magnet and a valve rod, wherein a valve body inlet is formed at one end of the shell, and the valve cover is correspondingly disposed on the outer side of the valve body inlet, wherein the side surface of the shell is provided with a plurality of valve body outlets, wherein the magnet is correspondingly disposed on the outer side of the other end of the shell, wherein one end of the valve rod is firmly connected to the center of the bottom surface of the valve cover, and the other end of the valve rod is detachably connected to the magnet, wherein the length of the valve rod is greater than that of the shell, wherein the valve inlets of the two magnetic drive valves are respectively connected to the hot fluid valve port and the cold fluid valve port, wherein the magnet is disposed to correspond to a plurality of external magnets.

15. The magneto-caloric power generation equipment of claim 14, wherein the magnetic drive valve comprises a magnet conductive cover, wherein the bottom of the magnet conductive cover is provided with an accommodating hole, wherein the center of the upper surface of the magnet conductive cover is provided with a through-hole, which is interconnected to the accommodating hole, wherein the magnet is disposed in the accommodating hole, and a fixing hole is provided on the magnet, wherein an expansion column is disposed at the lower end of the valve rod, wherein the expansion column, which is inserted through the through hole, is fixed in the fixing hole.

16. The magneto-caloric power generation equipment of claim 15, wherein a guiding sleeve is fixed in the center of the shell, wherein the valve rod is slidably disposed in the guiding sleeve, wherein the guiding sleeve is disposed in the shell through a plurality of supporting pieces, which are firmly connected between the outer wall of the guiding sleeve and the inner wall of the shell.

17. The magneto-caloric power generation equipment of claim 16, wherein the circumferential edge of the bottom surface of the valve cover is provided with a sealing bevel A, and the circumferential edge of the valve body inlet is provided with a sealing bevel B, wherein the sealing bevel A corresponds to the sealing bevel B, wherein a silicon ring is disposed on the sealing bevel A or the sealing bevel B.

18. The magneto-caloric power generation equipment of claim 17, wherein the outer wall of the upper end of the shell is provided with an annular step portion, wherein a connecting portion is formed between the annular step portion and the circumferential edge of the valve body inlet, wherein the connecting portion of the two magnetic drive valves is inserted into and connected to the hot fluid valve port and the cold fluid valve port.

19. The magneto-caloric power generation equipment of claim 7, wherein the correcting mechanism A is disposed on the supporting side plate, wherein the correcting mechanism A comprises an correcting column which is disposed at the upper end of the supporting side plate, and an correcting groove which is provided at the lower end of the supporting side plate, wherein the correcting column is disposed to correspond to the correcting groove, wherein the correcting column and the correcting groove are asymmetrically or irregularly disposed, wherein the bottoms of the two sides of the correcting groove are on the same horizontal plane.

20. The magneto-caloric power generation equipment of claim 19, a water system fixing groove is formed between the axle seat A and the two supporting beams of the upper end of the two supporting side plates, wherein the bottom of the fixing groove is provided with a plurality of correcting locating grooves, wherein a plurality of correcting recessed strips is disposed at the bottom of the support body, wherein the correcting positioning grooves are provided to correspond to the correcting recessed strips.

21. The magneto-caloric power generation equipment of claim 20, wherein a mounting groove is provided, in which the axle seat A and the upper end of one of the supporting side plates are connected , wherein the mounting plate is fixed in the mounting groove.

22. The magneto-caloric power generation equipment of claim 21, wherein a detection hole is provided, in which the axle seat A and the lower end of at least one supporting side plate are connected.

\* \* \* \* \*